(12) United States Patent
Lynn

(10) Patent No.: US 12,217,377 B2
(45) Date of Patent: Feb. 4, 2025

(54) TECHNOLOGIES FOR RENDERING PORTIONS OF EDITABLE PRODUCT DESIGNS

(71) Applicant: CIMPRESS SCHWEIZ GMBH, Winterthur (CH)

(72) Inventor: Zachary Ross Lynn, Lexington, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 104 days.

(21) Appl. No.: 17/885,222

(22) Filed: Aug. 10, 2022

(65) Prior Publication Data

US 2024/0054744 A1    Feb. 15, 2024

(51) Int. Cl.
*G06T 19/20*  (2011.01)
*G06T 13/20*  (2011.01)
*G06T 15/10*  (2011.01)

(52) U.S. Cl.
CPC ............. *G06T 19/20* (2013.01); *G06T 13/20* (2013.01); *G06T 15/10* (2013.01); *G06T 2200/24* (2013.01); *G06T 2210/12* (2013.01); *G06T 2219/2016* (2013.01)

(58) Field of Classification Search
CPC .......... G06T 15/10; G06T 19/20; G06T 13/20
See application file for complete search history.

(56) References Cited

U.S. PATENT DOCUMENTS

| | | | | |
|---|---|---|---|---|
| 7,233,326 | B1* | 6/2007 | Silva | G06T 19/20 |
| | | | | 345/619 |
| 2019/0139319 | A1* | 5/2019 | Eisenmann | G06T 19/20 |
| 2021/0350632 | A1* | 11/2021 | Ghassaei | G06F 3/04815 |
| 2022/0035970 | A1* | 2/2022 | Cheshire | G06F 30/10 |
| 2023/0368458 | A1* | 11/2023 | Dryer | G06T 19/20 |

OTHER PUBLICATIONS

Adhikari, Aradhana. 3D visualization tool for custom electronics fabrication using laser cutter. Diss. Massachusetts Institute of Technology. (Year: 2020).*

* cited by examiner

*Primary Examiner* — Diane M Wills
(74) *Attorney, Agent, or Firm* — MARSHALL, GERSTEIN & BORUN LLP

(57) ABSTRACT

Systems and methods for rendering portions of editable product designs are disclosed. According to certain aspects, an electronic device may support a design application that may apply a rendering algorithm to an editable product design, resulting in the application rendering the editable product design for viewing by a user in a first and a second portion of a user interface. In particular, the rendering algorithm may determine whether or not to adjust the editable product design from a first configuration and first orientation to a second configuration and/or a second orientation based on a selection from the user of a portion of the editable product design within the first portion of the user interface. Based on that determination, the application may render the editable product design in the second portion of the user interface in at least one of the second configuration and/or the second orientation.

18 Claims, 8 Drawing Sheets

TECHNOLOGIES FOR RENDERING PORTIONS OF EDITABLE PRODUCT DESIGNS

FIELD

The present disclosure is directed to improvements related to digital product design rendering. More particularly, the present disclosure is directed to platforms and technologies for rendering portions of editable product designs.

BACKGROUND

Various printing and design services (e.g., via websites) that enable users to design products are well known and widely used by many consumers, professionals, and businesses.

Personalized products may include both printed paper products and customized promotional products including, for instance, various articles of clothing such as t-shirts. In particular, customized boxes/packaging is an important offering for many design services in order to enable users to provide their customers with branded and/or otherwise uniquely designed boxes/packaging. Typically, these services may display digital renderings of boxes/packaging to enable users to visualize and apply designs and other customization to the renderings as part of the product design process prior to purchasing/printing/etc.

It is advantageous for services to provide users a high-fidelity representation of the boxes and/or other products, and more specifically, to allow users to easily and clearly view various portions of the products to ensure each portion of the product is designed to the user's specifications. However, it is difficult to automatically determine whether or not various portions of editable product designs are displayable to the user and/or how to display the various portions to the user, as many editable product designs include multiple configurations (e.g., closed box, open box, etc.) and multiple orientations that may be required in order to view each portion of the editable product design. As a result of these multiple configurations and multiple orientations, conventional digital rendering techniques executed as part of conventional design services frequently make erroneous determinations about whether or not various portions are displayable to a user and how such portions are best displayed to the user. Further, many users are unfamiliar with or otherwise unable to manually manipulate these editable product designs in a manner sufficient to properly view the portion(s) of the design that the user intends to edit.

Therefore, there is an opportunity for systems and methods to accurately and effectively render portions of editable product designs, including accurately and effectively automatically determining whether or not various portions of rendered product designs are displayable to the user and/or how to display the various portions to the user.

SUMMARY

In an embodiment, a computer-implemented method for rendering portions of editable product designs is provided. The computer-implemented method may include: rendering an editable product design for viewing by a user within a first portion of a user interface and a second portion of the user interface, the editable product design being rendered within the second portion in a first configuration and a first orientation; receiving, from the user interacting with the editable product design within the first portion of the user interface, a selection of a portion of the editable product design; determining, by a rendering algorithm based on the selection, (i) whether or not to adjust the editable product design from the first configuration to a second configuration that causes the portion to be displayable on the user interface and (ii) whether or not to adjust the editable product design from the first orientation to a second orientation that causes the portion to be displayed on the user interface; and based on the determining, rendering the editable product design within the second portion of the user interface in at least one of the second configuration or the second orientation in order to render the portion of the editable product design within the second portion of the user interface for viewing by the user.

According to another embodiment, a system for rendering portions of editable product designs is provided. The system may include: a user interface; a memory storing a set of computer-readable instructions comprising at least a rendering algorithm; and a processor interfacing with the user interface and the memory. The processor may be configured to execute the set of computer-readable instructions to cause the processor to: render an editable product design for viewing by a user within a first portion of the user interface and a second portion of the user interface, the editable product design being rendered within the second portion in a first configuration and a first orientation; receive, from the user interacting with the editable product design within the first portion of the user interface, a selection of a portion of the editable product design; determine, by the rendering algorithm based on the selection, (i) whether or not to adjust the editable product design from the first configuration to a second configuration that causes the portion to be displayable on the user interface and (ii) whether or not to adjust the editable product design from the first orientation to a second orientation that causes the portion to be displayed on the user interface; and based on the determining, render the editable product design within the second portion of the user interface in at least one of the second configuration or the second orientation in order to render the portion of the editable product design within the second portion of the user interface for viewing by the user.

Further, in an embodiment, a non-transitory computer-readable storage medium is provided. The non-transitory computer-readable storage medium has stored thereon a set of instructions for rendering portions of editable product designs, where the set of instructions may comprise: instructions for rendering an editable product design for viewing by a user within a first portion of a user interface and a second portion of the user interface, the editable product design being rendered within the second portion in a first configuration and a first orientation; instructions for receiving, from the user interacting with the editable product design within the first portion of the user interface, a selection of a portion of the editable product design; instructions for determining, by a rendering algorithm based on the selection, (i) whether or not to adjust the editable product design from the first configuration to a second configuration that causes the portion to be displayable on the user interface and (ii) whether or not to adjust the editable product design from the first orientation to a second orientation that causes the portion to be displayed on the user interface; and based on the determining, instructions for rendering the editable product design within the second portion of the user interface in at least one of the second configuration or the second orientation in order to render the portion of the editable product design within the second portion of the user interface for viewing by the user.

DETAILED DESCRIPTION

Figure 1A:
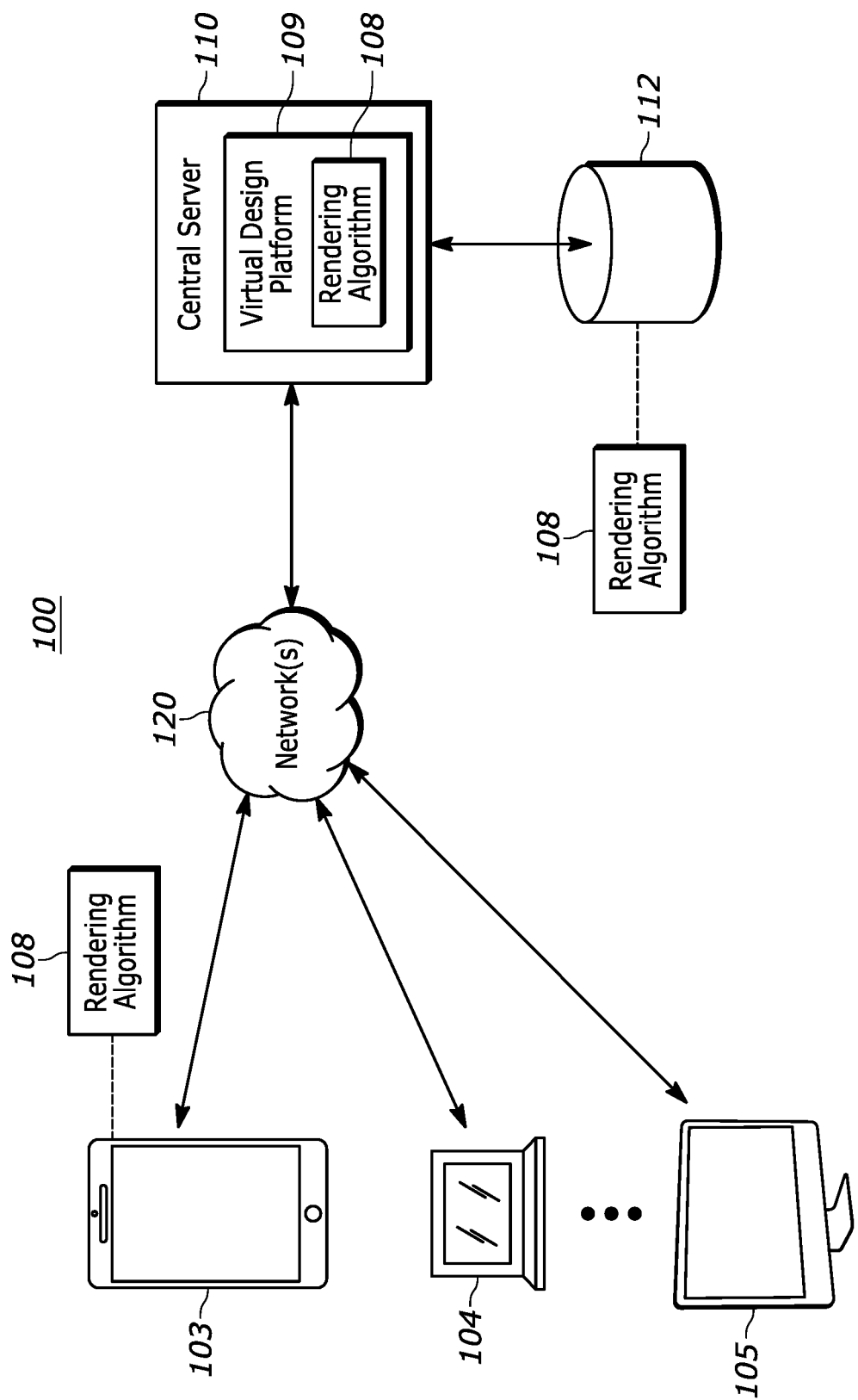
FIG. 1A depicts an overview of components and entities associated with the systems and methods for rendering portions of editable product designs, in accordance with some embodiments.

The present embodiments may relate to, inter alia, platforms and technologies for automatically determining how to render, and thereafter rendering, portions of editable product designs. According to certain aspects, the systems and methods may enable a user to view relevant portions of editable product designs in response to a user interacting with the editable product design. More specifically, a user may interact with an editable product design that is rendered for display on a design platform by selecting a portion of the editable product design, and the systems and methods of the present disclosure may automatically render the editable product design in a configuration and orientation that best enables the user to view and modify the selected portion of the editable product design.

As referenced herein, a "configuration" of an editable product design may generally refer to an arrangement of elements (e.g., portions) comprising the editable product design that results in the editable product design having a particular form, figure, or multi-dimensional shape. Thus, the configuration of an editable product design may change when the elements comprising the editable product design are re-arranged, such that after the re-arrangement, the editable product design has a different form, figure, or multi-dimensional shape (e.g., closed box to open box). Further, an "orientation" of an editable product design may generally refer to a position and/or rotation/direction of the editable product design relative to a portion of a user interface. Accordingly, the orientation of an editable product design may change as the editable product design is repositioned and/or rotated within the portion of the user interface, such that after the repositioning and/or rotation, the editable product design is located in a different position and/or with a different rotation/direction relative to the portion of the user interface.

Typically, design platforms may include a three-dimensional (3D) rendering of a product that enables the user to determine what the real-world product may look like once the user is finished designing it. Such a 3D product design rendering is particularly helpful for users because interacting with a flattened and/or otherwise deconstructed model of a product design (e.g., an unfolded box) can be confusing and may not allow the user to accurately conceptualize the visual impact of their design choices on the resulting product. However, conventional techniques for rendering such a 3D product design experience many issues, such as inaccurately and/or completely failing to adjust the orientation and/or configuration of a 3D product design while a user is editing the design. As a result, conventional techniques waste processing resources and time through inaccurate adjustments to the 3D product design, and they create a highly unsavory user experience by disabling the user from viewing the portions of the product design that are impacted by the user's design choices.

By contrast, the systems and methods of the present disclosure alleviate these, and other, issues experienced by conventional techniques by accurately and efficiently adjusting the orientation and configuration of editable product designs as a user selects various portions of the editable product design. As an example, a user may want to design a box to be used as packaging for the user's business, so the user may access a design platform utilizing the systems and methods of the present disclosure. The systems and methods of the present disclosure may render an editable product design (e.g., a generic box design) for viewing and/or modification by the user, and the editable product design may initially feature the generic box in a closed configuration, such that the interior surfaces of the generic box are not displayable to the user simply by rotating and/or otherwise changing the orientation of the generic box. In this example, the user may select a portion of the editable product design for closer inspection that is an interior surface of the generic box. The systems and methods of the present disclosure may automatically determine that the selected interior surface of the editable product design is not displayable to the user in the current configuration of the editable product design. Further, the systems and methods of the present disclosure may determine that the configuration of the editable product design should be changed to an open configuration that will expose the interior surfaces of the generic box, thereby causing the selected interior surface to be displayable to the user on the user interface. The systems and methods of the present disclosure may also determine whether or not to adjust the orientation of the editable product design to ensure that the user is able to view the entire selected portion without any obscuration.

To facilitate many of the functions mentioned in the prior example, the systems and methods of the present disclosure may render an editable product design for viewing by a user in multiple portions of a user interface (e.g., a first portion and a second portion). Each of the portions of the editable product design rendered in the first portion of the user interface may be selectable, such that a user may select one or more of the selectable portions in order for the systems and methods of the present disclosure to determine how to configure and orient the editable product design in the second portion of the user interface. Accordingly, the editable product design in the second portion of the user interface may be rendered in a certain configuration and orientation by the systems and methods of the present disclosure in response to the selection made by the user of a selectable portion of the editable product design in the first portion of the user interface. The certain configuration and orientation in which the editable product design within the second portion is rendered is determined by the systems and methods of the present disclosure in order to cause the selected portion of the editable product design to be clearly viewable by the user (e.g., unobscured by other portions of the editable product design).

The systems and methods of the present disclosure offer numerous benefits. Specifically, the configuration and orientation determinations of the present disclosure provide solutions in a number of situations where conventional techniques fail. For example, when a user desires to view a portion of a product design that is not currently displayable (e.g., an interior box surface), conventional techniques typically do not change the configuration (e.g., open the box, close the box) of the editable product design in order to cause the portion to be displayable to the user. Instead, conventional techniques may simply leave the product design unaltered, unless and until the user selects a different portion of the product design that is currently displayable to the user. In these instances, the user may be forced to manually adjust the product design and/or may simply be unable to view the desired portion of the product design entirely, both of which can create user confusion and lead to decreased user satisfaction.

On the other hand, the systems and methods of the present disclosure automatically determine and render the editable product design in a suitable configuration and/or orientation every time the user selects a different portion of the product design. Thus, the systems and methods of the present disclosure completely avoid such user satisfaction problems experienced by conventional techniques by automatically determining and rendering the editable product designs in configurations and orientations that consistently enable the user to clearly view the desired portion without requiring any user intervention. An entity or service that supports the systems and methods of the present disclosure may correspondingly be afforded an improved user experience and increased sales. However, it should be appreciated that additional benefits are envisioned.

Further, the systems and methods of the present disclosure include improvements in computer functionality or in improvements to other technologies at least because the disclosure describes that a computing device is improved where the intelligence of the computing device is enhanced by a rendering algorithm. The rendering algorithm, executing on the computing device, is able to more accurately determine, based on user selections of portions of editable product designs, (i) whether or not to adjust an editable product design from a first configuration to a second configuration that causes a portion to be displayable on a user interface and (ii) whether or not to adjust the editable product design from a first orientation to a second orientation that causes the portion to be displayed on the user interface.

That is, the present disclosure describes improvements in the functioning of the computer itself or "any other technology or technical field" because a computing device is enhanced with a rendering algorithm to accurately determine whether or not to adjust a configuration and/or an orientation of an editable product design based on a user selection of a portion of the editable product design. This improves over the prior art at least because existing systems lack such determination functionality and are simply not capable of accurately analyzing digital renderings of 3D product designs to output a determination of whether or not to adjust a configuration and/or an orientation of an editable product design.

The systems and methods discussed herein also improve the functioning of a computer by improving virtual design platforms. Conventionally, renderings of 3D product designs presented to a user on such design platforms include irrelevant portions of the 3D product designs and/or are inaccurately adjusted, such that users are unable to clearly view relevant portions of the 3D product designs. The systems and methods of the present disclosure are an improvement to these conventional virtual design platforms because the present systems and methods employ a rendering algorithm to accurately determine whether or not to adjust a configuration and/or an orientation of an editable product design, resulting in an accurate, clear rendering of relevant portions of the editable product design that conventional virtual design platforms are incapable of accomplishing.

FIG. 1A illustrates an overview of a system 100 of components configured to facilitate the systems and methods of the present disclosure. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in customizing and/or otherwise creating a digital product design. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Each of the electronic devices 103, 104, 105 may execute or interface with a design application or platform, such as virtual design platform 109, that enables the customization and editing of digital product designs (also referenced herein as an "editable product design").

In certain aspects, an electronic device (e.g., electronic device 103) may include a rendering algorithm 108 that is configured to determine whether or not to adjust (i) a configuration and/or (ii) an orientation of an editable product design for display on a user interface based on a selection from a user. The electronic device may thereby receive and process user selections and/or interactions with a design application or platform (e.g., virtual design platform 109) to locally make such determinations that may be saved locally on a memory of the electronic device and/or used as part of the design application or platform. However, generally speaking, the design application or platform 109 and the rendering algorithm 108 may be hosted or otherwise facilitated by the central server 110. Regardless, it should be appreciated that any of the electronic devices 103, 104, 105 may include the rendering algorithm 108.

The electronic devices 103, 104 105 may communicate with a central server 110 via one or more networks 120. The central server 110 may be associated with the entity that owns, operates, and/or manages the virtual design platform 109. In particular, the central server 110 may include or support a web server configured to host a website that enables users to operate the virtual design platform 109. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with editable product designs, formats, templates, and/or design elements for the editable product designs and templates. For example, the storage 112 may store templates of editable product designs, including design elements for the different templates.

Further, in some aspects, the storage 112 may include the rendering algorithm 108 that is configured to determine whether or not to adjust (i) a configuration and/or (ii) an orientation of an editable product design for display on a user interface based on a selection from a user. The central server 110 may thereby receive and process user selections and/or interactions with the virtual design platform 109 from electronic devices 103, 104, 105 by accessing the rendering algorithm 108 from the storage 112. The determinations made by the rendering algorithm 108 may then be saved in a memory of the storage 112.

Although three (3) electronic devices 103, 104, 105 and one (1) central server 110 are depicted in FIG. 1A, it should be appreciated that greater or fewer amounts are envisioned. For example, there may be multiple central servers, each one associated with a different entity.

Figure 1B:
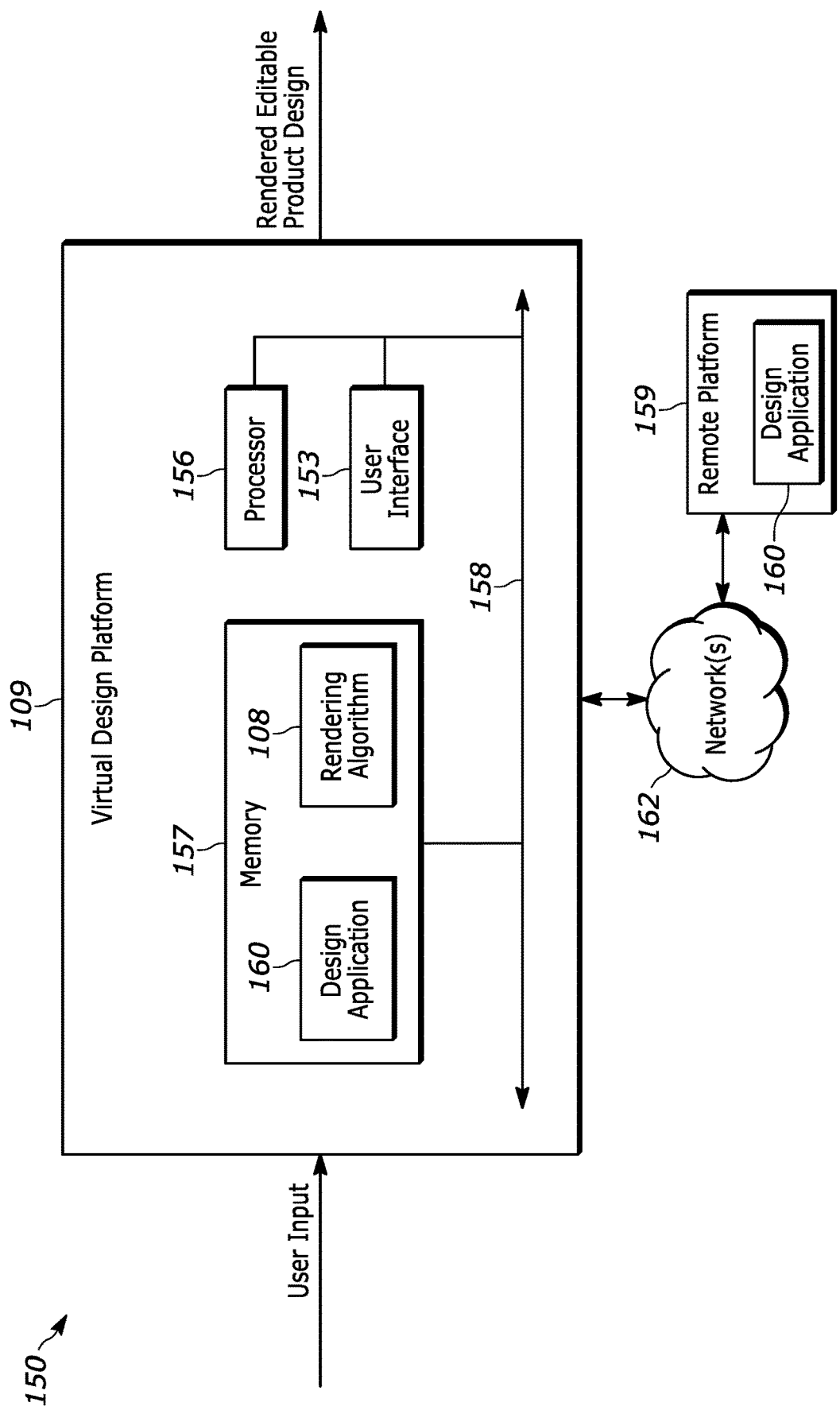
FIG. 1B depicts an overview of certain components configured to facilitate the systems and methods for rendering portions of editable product designs, in accordance with some embodiments.

According to embodiments, users of the electronic devices 103, 104, 105 may access the virtual design platform 109 in order to view and modify editable product designs using the electronic devices 103, 104, 105. As part of this viewing and modification of the editable product designs, the rendering algorithm 108 may automatically determine adjustments to the configuration and/or the orientation of the editable product design in response to user selections of portions of the editable product design. The adjusted editable product designs may be rendered for display to the user on one or more of the electronic devices 103, 104, 105. The user may also modify the editable product designs by incorporating digital images and/or any other suitable media that is uploaded, downloaded, stored and/or otherwise accessible by the electronic devices 103, 104, 105 and/or the central server 110. The digital image(s) may include, for example, a digital image or video in various file formats (e.g., JPEG, TIFF, GIF, PNG, Raw, MP4, MOV, etc.), where the digital image(s) or video(s) may depict visual content that may be composed of one or more design elements. In particular, the users may use the respective electronic devices 103, 104, 105 to modify the editable product designs using the accessed images across one or more formats before, during, and/or after the rendering algorithm 108 processes the user selections of portions of the editable product designs to make determinations corresponding to the configuration and/or the orientation of the editable product design. FIG. 1B depicts more specific components associated with the systems and methods.

FIG. 1B an example environment 150 in which a user input is processed into a rendered editable product design via a virtual design platform 109, according to embodiments. The virtual design platform 109 may be implemented on any computing device, including one or more of the electronic devices 103, 104, 105 or the central server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 109 may further include a user interface 153 configured to present content (e.g., editable product designs, digital images, digital designs and components/elements thereof). Additionally, a user may make selections to the content via the user interface 153, such as to modify/adjust editable product designs presented thereon. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines/algorithms (e.g., the rendering algorithm 108), applications (e.g., the design application 160), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the processor 156 of the computing device.

The virtual design platform 109 may operate in a networked environment and communicate with a remote platform 159 including the design application 160, via a network 162, such as a local area network (LAN), a wide area network (WAN), or other suitable network.

According to embodiments, the virtual design platform 109 (and more particularly, the design application 160) may process the user input to produce the rendered editable product design by applying the rendering algorithm 108. The user input may be embodied as any type of interaction of a user with an editable product design displayed to the user as part of the design application, such as the user clicking, dragging, gesturing, swiping, tapping, and/or otherwise selecting a portion of the editable product design. The rendered editable product design may be embodied as any type of electronic image, video, document, file, template, etc., that may include some type of displayable content (e.g., a combination of textual and/or visual content). More specifically, the rendered editable product design may be a realistic three-dimensional (3D) representation of a product in a configuration and orientation as determined by the rendering algorithm 108 based on the user input, and the product may also be represented by the editable product design with which the user interacts when providing the user input.

The design application 160 may enable a user to adjust, modify, and/or otherwise select certain portions of an editable product design to create product designs to share, communicate, apply to items, and/or save for later use. For example, a user may select an editable product design for a t-shirt, and the design application 160 may enable the user to place various designs, logos, images, symbols, text, and/or any other suitable data onto the editable product design of the t-shirt. In this example, the user may desire to edit the back surface of the t-shirt, and the user may click on the back surface portion of the editable product design, as displayed to the user as part of the design application 160. The rendering algorithm 108 may receive the user input selecting the back surface portion of the t-shirt editable product design and may proceed to determine a configuration and orientation of the editable product design that enables the user to easily and clearly view the back surface portion, and thereby easily and clearly modify/adjust the design of the back surface portion. Accordingly, the rendering algorithm 108 may configure and orient the editable product design for the user to readily interact with the desired portion of the editable product design, and the design application 160 may generally enable the user to adjust/modify the design of the editable product design once the editable product design is properly configured and oriented.

In certain aspects, the virtual design platform 109 may enable storing the rendered editable product design in the memory 157 or other storage, and/or may upload the rendered editable product design to the remote platform 159 for use in association with the design application 160 stored thereon. Moreover, according to embodiments, the rendered editable product design may include at least one digital image or video in various file formats (e.g., JPEG, TIFF, GIF, PNG, Raw, MP4, MOV, etc.).

Figure 2A:
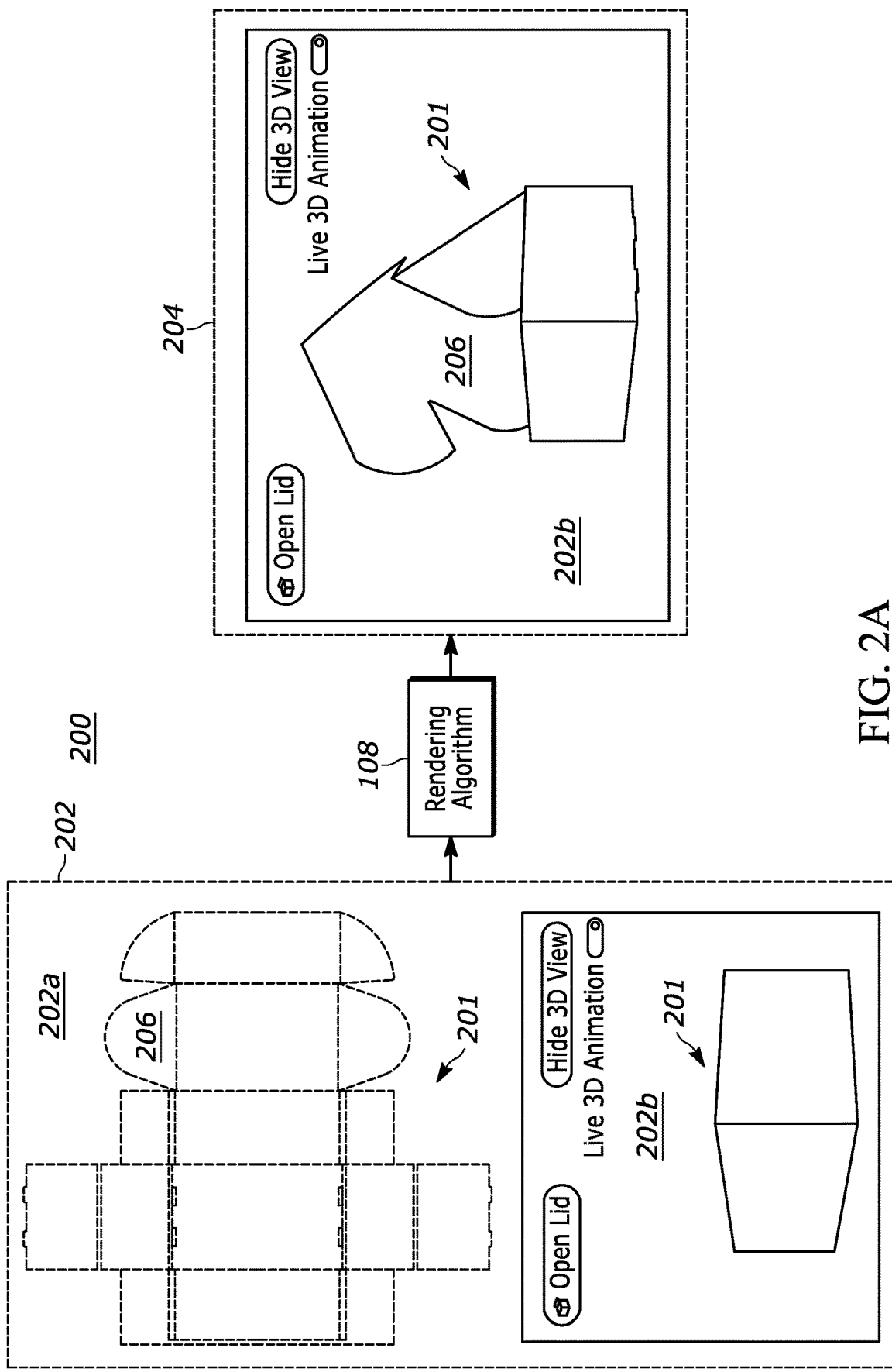
FIGS. 2A-2C illustrate an example animation sequence to render portions of an editable product design displayable to a user, in accordance with some embodiments.
Figure 2B:
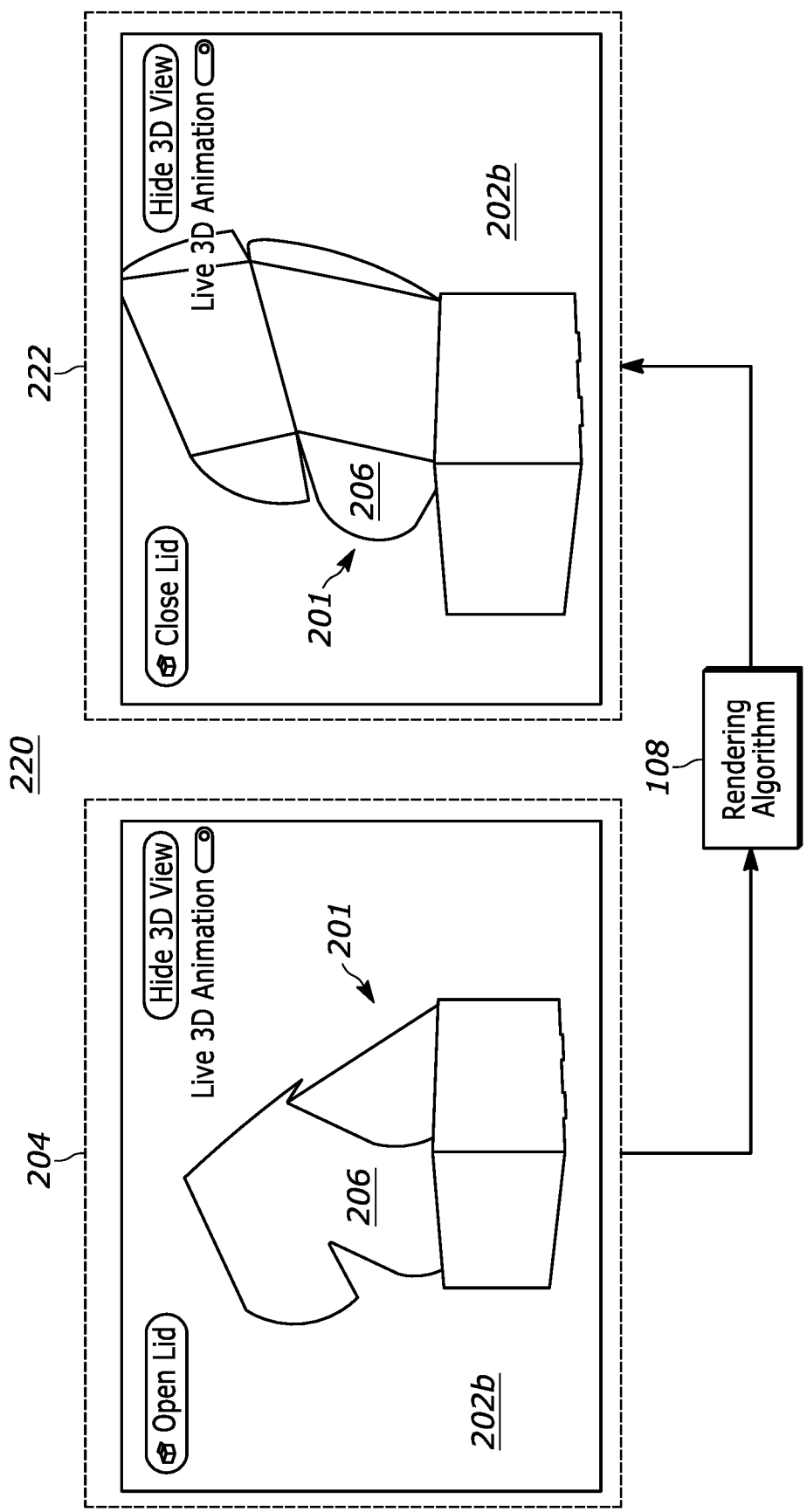

FIGS. 2A-2B illustrate an example animation sequence to render a portion of an editable product design displayable to a user, in accordance with some embodiments. Generally speaking, a user may access a design application (e.g., design application 160) which may render an editable product design for modification/adjustment by the user. For example, a user may utilize an electronic device (e.g., devices 103, 104, 105) to execute the design application and interact with the rendered editable product designs. The user may modify/adjust the editable product design by selecting a portion of the editable product design, and a rendering algorithm (e.g., rendering algorithm 108) may determine a suitable configuration and orientation for the editable product design that enables the user to more easily/readily continue to modify/adjust the editable product design. Of course, the electronic device may interface with other hardware components, such as a remote platform (e.g., remote platform 159).

More specifically, FIG. 2A illustrates a first portion 200 of an example animation sequence to render a portion of an editable product design 201 displayable to a user, in accordance with some embodiments. The first portion 200 of the example animation sequence is generally separated into two distinct time intervals 202, 204 in which the rendering algorithm 108 determines a configuration and orientation of the editable product design 201, and the virtual design platform (e.g., virtual design platform 109) begins adjusting the editable product design 201 from a first configuration and/or a first orientation to a second configuration and/or a second orientation. The final adjustment of the editable product design 201 from the first configuration and/or a first orientation to a second configuration and/or a second orientation is illustrated in FIG. 2B.

In any event, the first time instance 202 includes a digital rendering of the editable product design 201 in a first GUI portion 202a of a user interface (e.g., user interface 153), and a digital rendering of the editable product design 201 in a second GUI portion 202b of the user interface. The editable product design 201 in the first GUI portion 202a may be in a different configuration and/or orientation of the design 201 in the second GUI portion 202b, and more particularly, the design 201 in the first GUI portion 202a may be in an unfolded, exploded, and/or otherwise deconstructed view that allows a user to view all or some of the editable surfaces of the editable product design 201. By contrast, the editable product design 201 in the second GUI portion 202b may be in a folded and/or otherwise constructed view that is representative of the intended construction of the product represented by the editable product design 201. Thus, any modifications or stylistic changes made by a user to the editable product design 201 within the first GUI portion 202a may appear on a corresponding location of the editable product design 201 within the second GUI portion 202b, such that the user may view how their modifications may appear on the product when constructed as intended (e.g., a folded and closed/open box).

A user may interact with the editable product design 201 within the first GUI portion 202a of the user interface, and as a result, the rendering algorithm 108 may adjust the editable product design 201 within the second GUI portion 202b. In particular, a user may select (e.g., click, tap, swipe, gesture, etc.) a portion of the editable product design 201 within the first GUI portion 202a, and the rendering algorithm 108 may initially check to determine whether or not the selected portion is displayable to the user on the editable product design 201 within the second GUI portion 202b. In other words, the rendering algorithm 108 may determine whether or not the editable product design 201 within the second GUI portion 202b is configured in a manner that allows the selected portion to be displayed to the user within the second GUI portion 202b without changing the configuration of the editable product design 201 within the second GUI portion 202b.

For example, a user may select a portion 206 of the editable product design 201 within the first GUI portion 202a. The rendering algorithm 108 may receive this selection of the portion 206 from the user, and may proceed to analyze the configuration of the design 201 within the second GUI portion 202b to determine whether or not the portion 206 is displayable in the second GUI portion 202b in the current configuration of the design 201 within the second GUI portion 202b. As illustrated in FIG. 2A, the editable product design 201 within the second GUI portion 202b is in a closed configuration at the first time instance 202. This closed configuration may cause the selected portion 206 to not be displayable in the second GUI portion 202b because interior portions (e.g., surfaces) of the design 201 are not exposed for display in the second GUI portion 202b in the closed configuration, and the portion 206 is an interior portion of the design 201. Thus, the rendering algorithm 108 cannot display the selected portion simply by changing the orientation of the editable product design 201, and as a result, the rendering algorithm 108 may determine that the portion 206 is not displayable in the second GUI portion 202b in the current configuration of the design 201 within the second GUI portion 202b.

The rendering algorithm 108 may proceed to determine whether or not the portion 206 is displayable based on specific analytical steps related to the geometry of the editable product design 201. In particular, the rendering algorithm 108 may analyze the geometry of the editable product design 201 to calculate/identify an optimal focal point within the second GUI portion 202b that ensures the entire portion 206 is visible by the user and not obstructed/occluded by another portion of the design 201. The "focal point" referenced herein may generally refer to a point of view or visual perspective of an editable product design that is at least partly a result of the configuration and orientation of the editable product design as rendered on a GUI for viewing by a user.

The geometry of the editable product design 201 may be loaded and/or otherwise stored in memory (e.g., memory 157) as a set of coordinates that define the portions, surfaces, boundaries, contours, etc. of the design 201 within the context of a predetermined coordinate system. For example, the set of coordinates defining the portions, surfaces, boundaries, contours, etc. of the editable product design 201 may be three dimensional (3D) or two dimensional (2D) Cartesian coordinates, cylindrical coordinates, spherical coordinates, and/or any other suitable coordinates from any suitable coordinate system. Further, the origin of the coordinate system may be in any suitable location, such as the center of the editable product design 201.

In any event, using this geometry, the rendering algorithm 108 may determine unit vectors for portions of the editable product design 201 in order to determine a direction in which each portion is facing for a particular configuration and orientation of the design 201. In certain aspects, the rendering algorithm 108 may determine the unit vectors for portions of the editable product design 201 by calculating an average normal vector for all vertices of the portion and normalizing the average normal vector. For example, a front surface of a box that is represented by an editable product design (e.g., editable product design 201) may have four vertices that define the corners of the front surface. The rendering algorithm 108 may calculate a unit vector for the front surface by calculating an average normal vector based on the normal vectors of the four vertices and then dividing the average normal vector by its vector norm.

With the unit vector for the portion, the rendering algorithm 108 may determine an approximate center of the portion. The rendering algorithm 108 may first calculate a center of the portion based on a bounding box that corresponds to the boundaries of the portion. The rendering algorithm 108 may calculate the bounding box for a portion by finding the maximum and minimum vertices for each spatial dimension of the portion, as defined by the relevant coordinate system. For example, the front surface of the editable product design of the prior example may not have any vertices with x-values that are greater than one or less than negative one, y-values that are greater than one or less than negative one, or z-values that are greater than one or less than 0.9. Thus, the rendering algorithm 108 may determine the bounding box for the front surface based on these maximum and minimum values of each spatial dimension that are representative of vertices located on the front surface. The rendering algorithm 108 may then calculate the center of the bounding box by determining an arithmetic mean coordinate position of all the points included as part of the bounding box. Of course, the bounding box may only approximate the shape of the front surface, so the rendering algorithm 108 determining the center of the bounding box may only determine an approximate center of the corresponding portion.

The rendering algorithm 108 may then cast a ray emitted from the center of the bounding box in the direction of the portion's unit vector in order to determine an optimal, non-occluded focal point for the portion. Generally, a ray cast by the rendering algorithm 108 may be a line extending from the center of a bounding box for a portion of an editable product design (e.g., editable product design 201) in the direction of the unit vector of that portion that may or may not intersect any other portion of the design. Such intersection of the ray cast by the rendering algorithm 108 with any other portion of the editable product design may be referenced herein as the ray being occluded.

If the ray cast by the rendering algorithm 108 is not occluded, then the algorithm 108 may determine that the current rendering of the editable product design 201 is already displayed in the optimal focal point that allows a user to view the selected portion directly. However, if the ray cast by the rendering algorithm 108 is occluded, the algorithm 108 may iteratively adjust the yaw and pitch rotation axes of the unit vector of the portion and continue to ray cast in the direction off the unit vector to identify occlusions. For example, the rendering algorithm 108 may iteratively adjust the yaw and pitch rotation axes of the unit vector by increments of 5 degrees, such that the algorithm 108 casts a ray from the unit vector every 5 degrees of rotation in either the yaw and/or the pitch axis to search for occlusions of the cast rays. The rendering algorithm 108 may also incrementally adjust the yaw and pitch axes of the unit vector independently between −90 and 90 degrees from the original unit vector's rotation, because incrementally adjusting the axes of the unit vector beyond that range may result in a focal point that is perpendicular to the portion, thereby causing the portion to not be viewable by the user.

While adjusting the axes of the unit vector for the portion, the rendering algorithm 108 may track whether or not any cast ray is non-occluded, thereby indicating a viable focal point because the user would be able to view the portion without occlusion from another portion of the editable product design 201. If, at any point, one of the rays cast by the rendering algorithm 108 is non-occluded, the rendering algorithm 108 may determine that the non-occluded ray is a target focal point. The rendering algorithm 108 may, for example, determine that a non-occluded ray with a smaller adjustment to the yaw and/or pitch axes of the unit vector may be an optimal focal point relative to a non-occluded ray with a larger adjustment to the yaw and/or pitch axes of the unit vector. The rendering algorithm 108 may make this determination because the smaller adjustment to the yaw and/or pitch axes generally enables the user to view the portion more directly (e.g., at a smaller angle), such that design modifications/adjustments (e.g., placing logos, designs, images, etc.) made by the user to the portion are also more easily viewable.

Regardless, if all rays cast by the rendering algorithm 108 are occluded, then the rendering algorithm 108 may determine that the portion (e.g., portion 206) is most likely internal facing, such that the portion is not displayable to a user. As a result, the rendering algorithm 108 may further determine that changing the configuration of the editable product design may be necessary to cause the portion to be displayable to a user. The rendering algorithm 108 may then determine if the geometry of the editable product design allows for animation sequences which could cause the portion to be displayable to a user. The rendering algorithm 108 may then cycle through each animation sequence and repeat the ray casting described above to determine if any rays are non-occluded. If any ray is non-occluded as a result of any of the animation sequences, the rendering algorithm 108 may determine that the editable product design may have to undergo the animation sequence to adjust the configuration prior to and/or while simultaneously adjusting the orientation of the design based on the direction of the non-occluded ray.

Animation sequences that adjust the configuration of the editable product design may be predetermined and stored in memory (e.g., memory 157), and/or the rendering algorithm 108 may receive one or more points of articulation corresponding to the editable product design that the algorithm 108 may use to determine one or more animation sequences. Namely, using the one or more points of articulation, the rendering algorithm 108 may adjust the configuration of the editable product design as part of an animation sequence by adjusting the portions of the design that are associated with the points of articulation. For example, the rendering algorithm 108 may utilize a first point of articulation that joins a top lid portion of a box to a back portion of the box to determine an animation sequence that results in the top lid portion rotating around the first point of articulation while the back portion remains stationary to simulate the lid of the box opening. Consequently, the rendering algorithm 108 may utilize this animation sequence to cause the internal portions of the box to be displayable.

In any event, the rendering algorithm 108 may perform this geometric analysis described above and herein to determine a non-occluded ray for use as the basis of the optimal focal point. In particular, the rendering algorithm 108 may follow the non-occluded ray a certain distance along the direction of the ray in order to orient the editable product design in a manner that enables the user to view the selected portion (e.g., portion 206). The rendering algorithm 108 may analyze the size of the editable product design's geometry in order to determine how far along the ray the algorithm 108 should travel in order to gain sufficient distance from the editable product design to render the entire selected portion for viewing by a user. When the rendering algorithm 108 determines a suitable distance from the editable product design, the algorithm 108 may configure and orient the editable product design such that a user may view the selected portion (e.g., portion 206) in a direction that is antiparallel to the direction of the unit vector of the selected portion.

With continued reference to FIG. 2A, the rendering algorithm 108 may determine that the portion 206 is not displayable within the second GUI portion 202b at the first time instance 202 simply by changing the orientation of the editable product design 201. In particular, the rendering algorithm 108 may determine the unit vector for the portion 206, determine a bounding box and a center of the bounding box of the portion 206, cast rays from the center in the direction of the unit vector, rotate the cast rays around the yaw and pitch axes, and determine that no ray cast from the center is non-occluded. Accordingly, the rendering algorithm 108 may proceed to determine a suitable configuration for the editable product design 201 that may cause the portion 206 to be displayable to the user within the second GUI portion 202b.

One of the predetermined configurations and/or an animation sequence determined by the rendering algorithm 108 may cause the top of the editable product design 201 to open, thereby causing the portion 206 to be displayable. The rendering algorithm 108 may thus determine that this open top configuration is necessary to cause the portion 206 to be displayable, so the algorithm 108 may re-configure the editable product design 201 by executing the animation sequence corresponding to opening the design 201 top. Thus, at the second time instance 204, the rendering algorithm 108 may be executing the animation sequence necessary to open the top of the editable product design 201. Moreover, as illustrated in FIG. 2A, the top of the design 201 is partially open, and the portion 206 is partially visible within the second GUI portion 202b.

FIG. 2B illustrates a second portion 220 of an example animation sequence to render a portion 206 of an editable product design 201 displayable to a user, in accordance with some embodiments. As illustrated in FIG. 2B at the second time instance 204, the top of the editable product design 201 is partially open, and the rendering algorithm 108 may continue executing the animation sequence necessary to cause the top of the design 201 to move into a fully open position.

At the third time instance 222, the rendering algorithm 108 may cause the top of the editable product design 201 into a fully open position, such that the portion 206 is fully displayable to the user within the second portion 202b. With the animation sequence to re-configure the editable product design 201 complete, a user may proceed to view the portion 206 and thereby adjust, modify, and/or otherwise interact with the portion 206 and/or any other suitable portion of the design 201. Of course, the portion 206 may not be in an optimal orientation to enable the user to view the portion 206 as clearly as possible, such that the rendering algorithm 108 may adjust the orientation of the editable product design 201 at the third time instance to place the portion 206 at the optimal focal point, as described above and herein. However, it should be appreciated that the rendering algorithm 108 may adjust the orientation of the editable product design in accordance with the geometrical analysis described above and herein at any suitable time, such as before, during, or after an animation sequence executed to cause a portion (e.g., portion 206) to be displayable to a user.

Figure 2C:
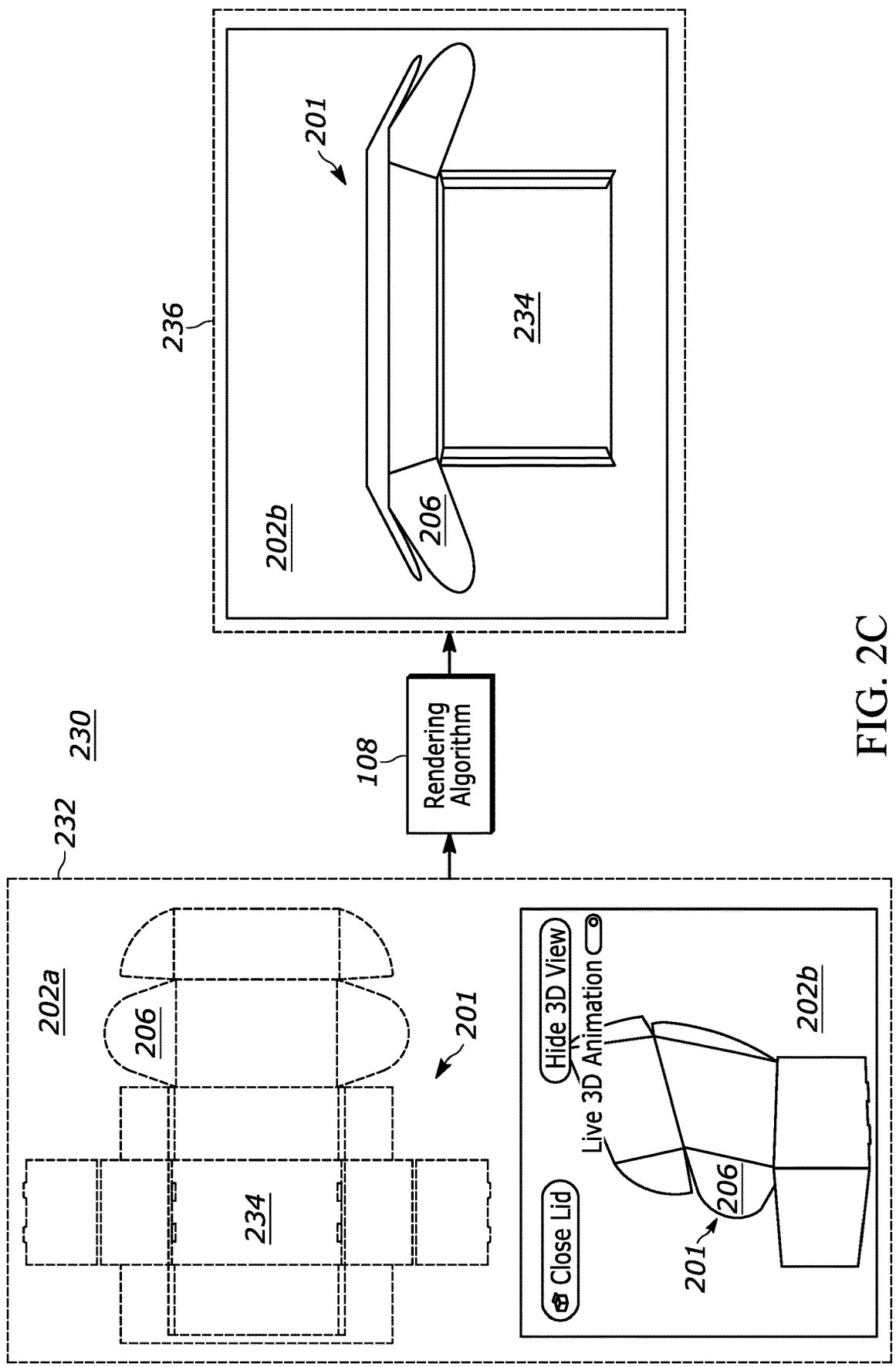

When the user has viewed and modified the portion 206 to their satisfaction, the user may desire to view and modify another portion of the editable product design 201. This subsequent selection of another portion of the editable product design 201 may cause the rendering algorithm 108 to perform more steps, an identical number of steps, or fewer steps than the prior number of steps taken from the first time instance 202 to the third time instance 222. As an example, FIG. 2C illustrates a third portion 230 of an example animation sequence to render another portion 234 of an editable product design 201 displayable to a user, in accordance with some embodiments.

The portion 234 may be an interior bottom portion 234 of the editable product design 201. When a user selects the portion 234, the rendering algorithm 108 may again determine a unit vector for the portion 234, determine a bounding box and a center of the bounding box of the portion 234, cast rays from the center in the direction of the unit vector, rotate the cast rays around the yaw and pitch axes, and determine that at least one ray cast from the center is non-occluded. Thus, unlike the portion 206 at time instance 202, the rendering algorithm 108 may determine that the portion 234 may be displayable to the user within the second GUI portion 202*b* in the current configuration of the editable product design 201 at the fourth time instance 232. However, the rendering algorithm 108 may also determine that the orientation of the editable product design 201 at the fourth time instance 232 is non-optimal for displaying the portion 234. The rendering algorithm 108 may therefore adjust the orientation of the editable product design 201 to the orientation illustrated at the fifth time instance 236, where the editable product design 201 is rendered in a top-down view to fully display the portion 234 within the second GUI portion 202*b*. In this orientation, the user may fully view the portion 234 in order to make any suitable adjustments, modifications, and/or any other suitable interactions with the portion 234.

Figure 3:
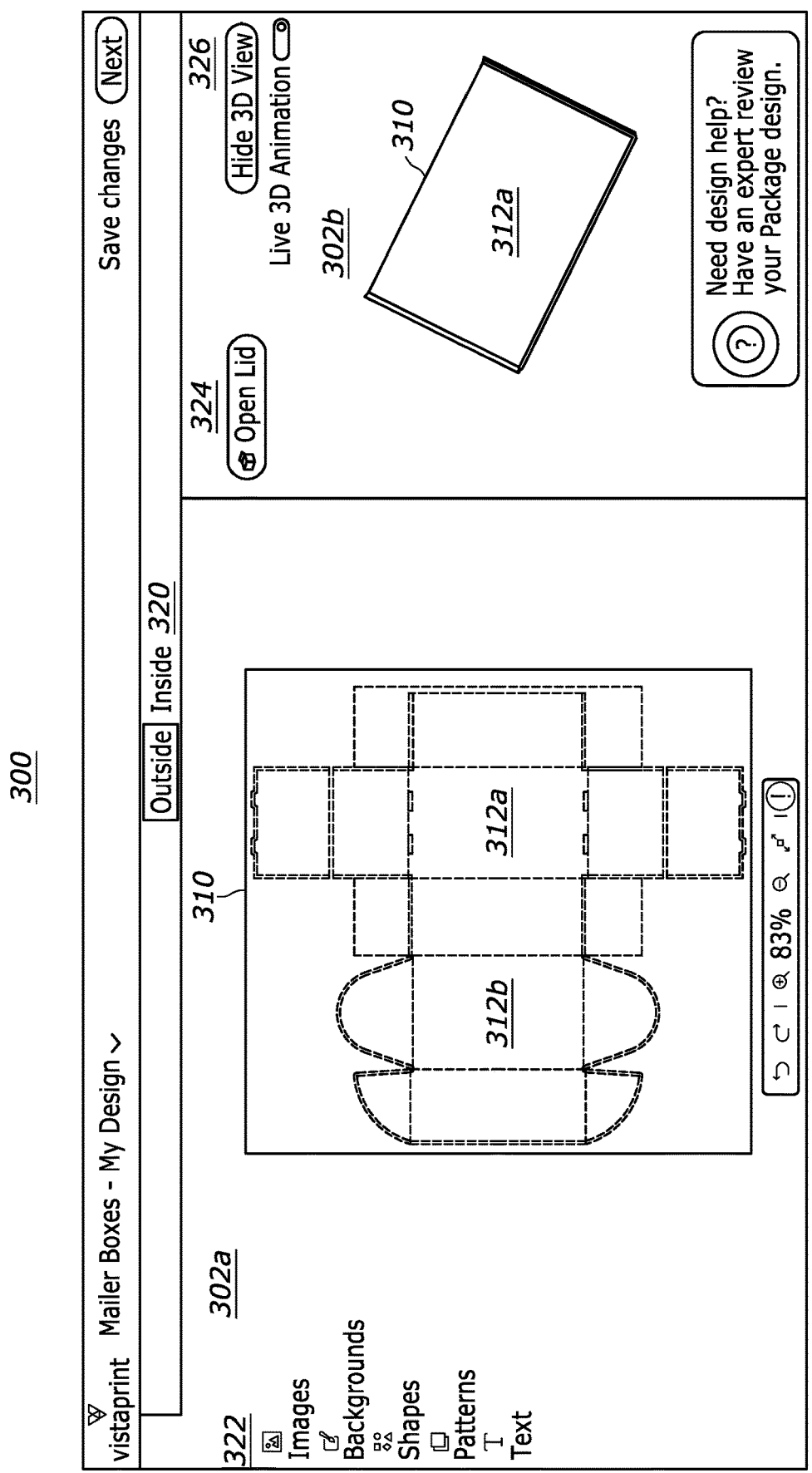
FIG. 3 depicts an example graphical user interface (GUI) in which a user may interact with and view editable product designs, in accordance with some embodiments.

FIG. 3 depicts an example graphical user interface (GUI) 300 in which a user may interact with and view an editable product design 310, in accordance with some embodiments. In particular, the example GUI 300 may be a user interface presented to a user as part of a virtual design platform (e.g., virtual design platform 109). Generally, the example GUI 300 includes a first GUI portion 302*a* and a second GUI portion 302*b*, and both GUI portions 302*a*, 302*b* include the editable product design 310. However, the editable product design 310 in the first GUI portion 302*a* is generally displayed in a different configuration and/or orientation than the design 310 in the second GUI portion 302*b*.

More particularly, the editable product design 310 in the first GUI portion 302*a* may be in an unfolded, exploded, and/or otherwise deconstructed view that allows a user to view all or some of the editable surfaces 312*a*, 312*b* of the editable product design 310. By contrast, the editable product design 310 in the second GUI portion 302*b* may be in a folded and/or otherwise constructed view that is representative of the intended construction of the product represented by the editable product design 310. Thus, any modifications or stylistic changes made by a user to the editable product design 310 within the first GUI portion 302*a* may appear on a corresponding location of the editable product design 310 within the second GUI portion 302*b*, such that the user may view how their modifications may appear on the product when constructed as intended (e.g., a folded and closed/open box).

A user may interact with the editable product design 310 within the first GUI portion 302*a* of the user interface, and as a result, a rendering algorithm (e.g., rendering algorithm 108) may adjust the editable product design 310 within the second GUI portion 302*b*. In particular, a user may select (e.g., click, tap, swipe, gesture, etc.) a portion of the editable product design 310 within the first GUI portion 302*a*, and the rendering algorithm may initially check to determine whether or not the selected portion is displayable to the user on the editable product design 310 within the second GUI portion 302*b*. In other words, the rendering algorithm may determine whether or not the editable product design 310 within the second GUI portion 302*b* is configured in a manner that allows the selected portion to be displayed to the user within the second GUI portion 302*b* without changing the configuration of the editable product design 310 within the second GUI portion 302*b*.

For example, a user may select a portion 312*a* of the editable product design 310 within the first GUI portion 302*a*. The rendering algorithm may receive this selection of the portion 312*a* from the user, and may proceed to analyze the configuration of the design 310 within the second GUI portion 302*b* to determine whether or not the portion 312*a* is displayable in the second GUI portion 302*b* in the current configuration of the design 310 within the second GUI portion 302*b*. As illustrated in FIG. 3, the editable product design 310 within the second GUI portion 302*b* is in a closed configuration. This closed configuration may enable the selected portion 312*a* to be displayable in the second GUI portion 302*b* because exterior portions (e.g., surfaces) of the design 310 are exposed for display in the second GUI portion 302*b* in this closed configuration, and the portion 312*a* is an exterior portion of the design 310. Thus, the rendering algorithm may be able to display the selected portion 312*a* without adjusting the configuration of the editable product design 310, and as a result, the rendering algorithm may determine that the portion 312*a* is displayable in the second GUI portion 302*b* in the current configuration of the design 310 within the second GUI portion 302*b*.

Of course, in certain instances, the user may select a portion of the editable product design 310 that requires the rendering algorithm to adjust the orientation of the design 310 within the second GUI portion 302*b*. For example, a user may select the portion 312*b* by interacting with the portion 312*b* on the editable product design 310 within the first GUI portion 302*a*. The rendering algorithm may then adjust the orientation of the design 310 within the second GUI portion 302*b* to display the portion 312*b* in the second GUI portion 302*b* instead of the portion 312*a*.

Further, the example GUI 300 may include various other features that enable a user to modify, adjust, and/or otherwise interact with the editable product design 310. For example, the option buttons 320 may enable the user to switch the selectable portions of the editable product design 310 from exterior portions (e.g., portions 312*a*, 312*b*) to interior portions (e.g., portions 206, 234). The option buttons 322 may enable the user to modify, adjust, and/or otherwise interact with the editable product design 310 by incorporating images, backgrounds, shapes, patterns, text, and/or any other suitable graphical features or combinations thereof onto the design 310. Option button 324 may enable the user to manually cause the rendering algorithm to execute an animation sequence of a specified type for the editable product design 310 within the second GUI portion 302*b*. For example, the option button 324 may cause the rendering algorithm to execute an animation sequence that opens the lid of the editable product design 310 within the second GUI portion 302*b*. Further, option button 326 may enable a user to hide the second GUI portion 302*b* altogether, such that the second GUI portion 302*b* collapses, and the editable product design 310 is only rendered in the first GUI portion 302*a*. Of course, the example GUI 300 may include any suitable functions, features, and/or combinations thereof to enable the user to perform any actions related to modifying, adjusting, and/or otherwise interacting with the editable product design 310.

Although not shown in FIG. 3, it should be appreciated that the virtual design platform may, for example in response to a user selection, automatically upload, print, publish, share, or otherwise avail any or all of the formats of the editable product design 310 to corresponding online, retail, or other services. In an implementation, an electronic device (e.g., devices 103, 104, 105) may enable the user to select to individually upload, print, publish, share, or otherwise avail any or all of the formats of the editable product design 310 to corresponding online, retail, or other services.

Figure 4:
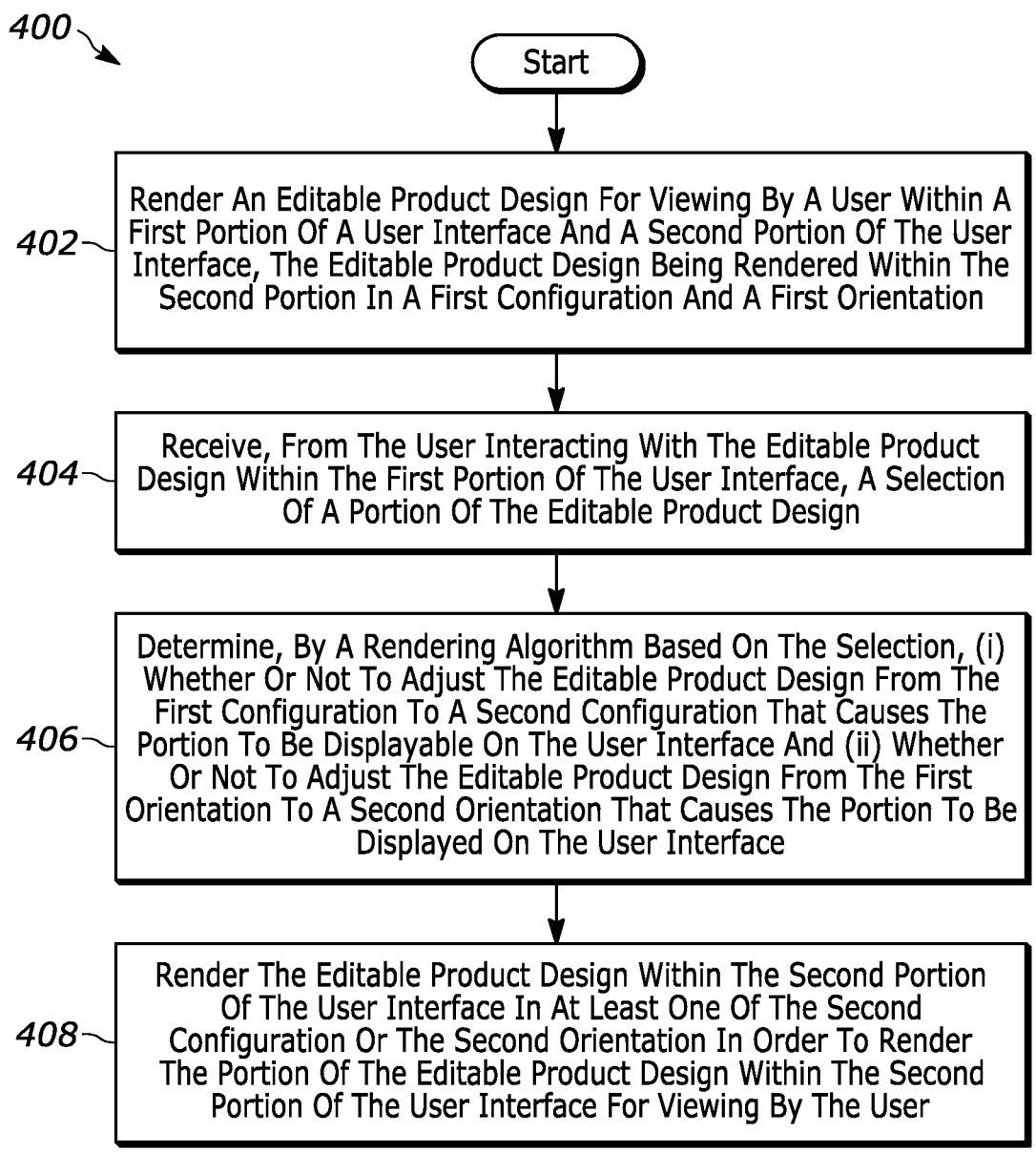
FIG. 4 is a block diagram of an example method for rendering portions of editable product designs, in accordance with some embodiments.

FIG. 4 is a block diagram of an example method 400 for rendering portions of editable product designs, in accordance with some embodiments. The method 400 may be facilitated by an electronic device (such as any of the devices 103, 104, 105 as depicted in FIG. 1A) that may be in communication with a server(s) (such as the central server 110, as discussed with respect to FIG. 1A) and/or a central server (e.g., central server 110). In embodiments, the method 400 may be at least partially facilitated by a remote server, such as the central server 110 as discussed with respect to FIG. 1A, and/or the electronic devices (e.g., devices 103, 104, 105 as depicted in FIG. 1A). Further, the electronic device(s) may operate or interface with a virtual design platform (e.g., virtual design platform 109), such as via a website, application, or the like.

The method 400 may include rendering an editable product design for viewing by a user within a first portion of a user interface and a second portion of the user interface (block 402). The editable product design may be rendered within the second portion in a first configuration and a first orientation. The method 400 may also include receiving, from the user interacting with the editable product design within the first portion of the user interface, a selection of a portion of the editable product design (block 404).

The method 400 may also include determining, by a rendering algorithm based on the selection, (i) whether or not to adjust the editable product design from the first configuration to a second configuration that causes the portion to be displayable on the user interface and (ii) whether or not to adjust the editable product design from the first orientation to a second orientation that causes the portion to be displayed on the user interface (block 406).

In certain aspects, each respective portion of the editable product design includes one or more vertices defining a respective bounding box for the respective portion. In these aspects, the method 400 may further include calculating, by the rendering algorithm, (a) an average normal vector in a first direction for the portion of the editable product design based on a vertex of the portion and (b) a center of the portion based on a bounding box of the portion. The rendering algorithm may also generate a ray emitting in the first direction that has an origin at the center of the portion; and the algorithm may determine, based on whether or not the ray is occluded from display on the user interface, (i) whether or not to adjust the first configuration of the editable product design to the second configuration and (ii) whether or not to adjust the first orientation of the editable product design to the second orientation.

In some aspects, the method 400 may further include determining, by the rendering algorithm, that the ray is occluded from display on the user interface. In these aspects, the method 400 may further include adjusting, by the rendering algorithm, the editable product design from the first orientation to the second orientation by rotating the editable product design along at least one of a pitch axis of the ray or a yaw axis of the ray until the ray is displayable on the user interface. Further in these aspects, the method 400 may further include rendering the editable product design within the second portion of the user interface in the second orientation. In some aspects, the method 400 may further include incrementally rotating, by the rendering algorithm, the editable product design along at least one of (i) the pitch axis of the ray by 5° between 900 and −90° relative to the first direction of the ray, or (ii) the yaw axis of the ray by 5° between 900 and −90° relative to the first direction of the ray.

In certain aspects, the editable product design is configured to be rendered within the second portion in a plurality of configurations. In these aspects, the method 400 may further include determining, by the rendering algorithm, that the ray is occluded from display on the user interface, and rotating, by the rendering algorithm, the editable product design along at least one of a pitch axis of the ray or a yaw axis of the ray. Further in these aspects, the method 400 may further include, responsive to determining that the ray is occluded from display on the user interface at all rotations of the pitch axis of the ray and the yaw axis of the ray, determining, by the rendering algorithm, that the second configuration of the plurality of configurations causes the portion to be displayable on the user interface.

Moreover, in the prior aspects, each respective configuration of the plurality of configurations may include a corresponding animation sequence that transitions the editable product design from the first configuration to the respective configuration. In these aspects, determining, by the rendering algorithm, that the second configuration of the plurality of configurations causes the portion to be displayable on the user interface may further include executing, by the rendering algorithm, each corresponding animation sequence for each respective configuration to determine whether or not any corresponding animation sequence causes the portion to be displayable on the user interface. Further in these aspects, the method 400 may additionally include determining, by the rendering algorithm, that a second corresponding animation sequence for the second configuration causes the portion to be displayable on the user interface. In these aspects, the method 400 may further include determining, by the rendering algorithm, that the second configuration of the plurality of configurations causes the portion to be displayable on the user interface.

In some aspects, the method 400 may further include rendering the editable product design within the second portion of the user interface in the second configuration. Further in these aspects, the method 400 may further include rendering an animation sequence that corresponds to the second configuration and causes the editable product design to transition from the first configuration to the second configuration.

In certain aspects, the method 400 may further include calculating, by the rendering algorithm, a respective bounding box for each respective portion of the editable product design based on a maximum vertex for each spatial dimension of the respective portion and a minimum vertex for each spatial dimension of the respective portion.

The method 400 may also include, based on the determining of block 406, rendering the editable product design within the second portion of the user interface in at least one of the second configuration or the second orientation in order to render the portion of the editable product design within the second portion of the user interface for viewing by the user (block 408).

In certain aspects, the editable product design is representative of a shipping box with a top, the first configuration includes the top being in a closed configuration, the second configuration includes the top being in an open configuration. In these aspects, rendering the editable product design within the second portion of the user interface in at least one of the second configuration or the second orientation may further include rendering an animation sequence that features the top of the editable product design transitioning from the first configuration to the second configuration.

In some aspects, rendering the editable product design within the second portion of the user interface in at least one of the second configuration or the second orientation in order to render the portion of the editable product design within the second portion of the user interface for viewing by the user further includes generating, by the rendering algorithm, a ray emitting in a first direction that has an origin at a center of the portion. In these aspects, the method 400 may further include rendering the editable product design within the second portion of the user interface based on a distance along the ray and a second direction that is antiparallel to the first direction.

Figure 5:
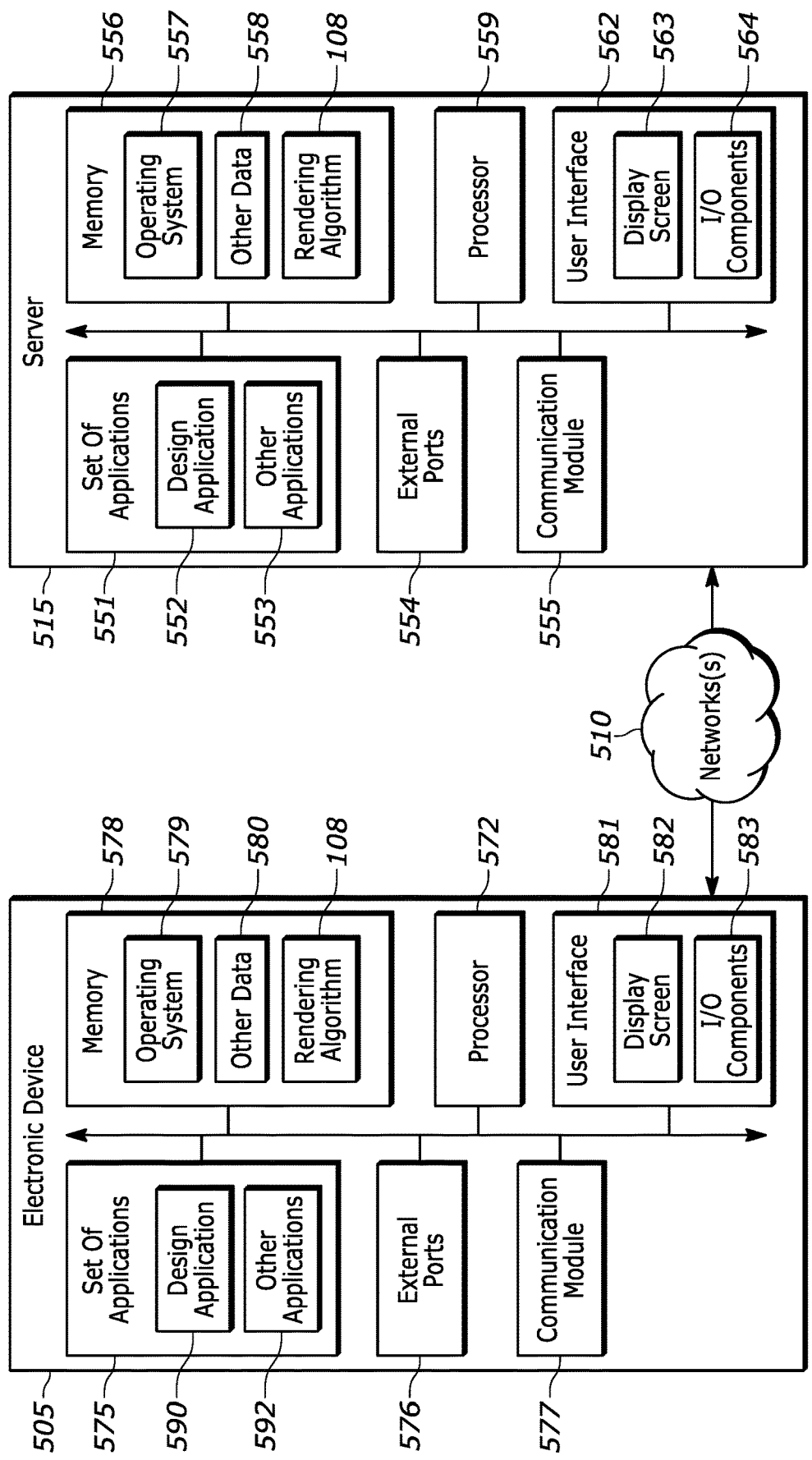
FIG. 5 is a hardware block diagram of an example electronic device and an example server, in which the functionalities as discussed herein may be implemented.

FIG. 5 is a hardware block diagram of an example electronic device 505 (such as one of the electronic devices 103, 104, 105 as discussed with respect to FIG. 1A) and an example server 515 (such as the central server 110 as discussed with respect to FIG. 1A), in which the functionalities as discussed herein may be implemented.

The electronic device 505 may include a processor 572 as well as a memory 578. The memory 578 may store an operating system 579 capable of facilitating the functionalities as discussed herein as well as a set of applications 575 (i.e., machine readable instructions) and the rendering algorithm 108. For example, one of the set of applications 575 may be a design application 590 configured to facilitate functionalities associated with rendering portions of editable product designs, as discussed herein. It should be appreciated that one or more other applications 592 are envisioned.

The processor 572 may interface with the memory 578 to execute the operating system 579, the set of applications 575, and the rendering algorithm 108. According to some embodiments, the memory 578 may also include other data 580 including formatting data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 505 may further include a communication module 577 configured to communicate data via one or more networks 510. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For example, the communication module 577 may communicate with the server 515 via the network(s) 510.

The electronic device 505 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs). According to some embodiments, the user may access the electronic device 505 via the user interface 581 to view/review various editable product designs, and make various selections.

In some embodiments, the electronic device 505 may perform the functionalities as discussed herein as part of a "cloud" network or may otherwise communicate with other hardware or software components within the cloud to send, retrieve, or otherwise analyze data.

As illustrated in FIG. 5, the electronic device 505 may communicate and interface with the server 515 via the network(s) 510. The server 515 may include a processor 559 as well as a memory 556. The memory 556 may store an operating system 557 capable of facilitating the functionalities as discussed herein as well as a set of applications 551 (i.e., machine readable instructions) and the rendering algorithm 108. For example, one of the set of applications 551 may be a design application 552 configured to facilitate functionalities associated with rendering portions of editable product designs, as discussed herein. It should be appreciated that one or more other applications 553 are envisioned.

The processor 559 may interface with the memory 556 to execute the operating system 557, the set of applications 551, and the rendering algorithm 108. According to some embodiments, the memory 556 may also include other data 558, such data received from the electronic device 505 and/or other data. The memory 556 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 515 may further include a communication module 555 configured to communicate data via the one or more networks 510. According to some embodiments, the communication module 555 may include one or more transceivers (e.g., WWAN, WLAN, and/or WPAN transceivers) functioning in accordance with IEEE standards, 3GPP standards, or other standards, and configured to receive and transmit data via one or more external ports 554.

The server 515 may further include a user interface 562 configured to present information to a user and/or receive inputs from the user. As shown in FIG. 5, the user interface 562 may include a display screen 563 and I/O components 564 (e.g., ports, capacitive or resistive touch sensitive input panels, keys, buttons, lights, LEDs). According to some embodiments, the user may access the server 515 via the user interface 562 to review information (e.g., various editable product designs), make selections, and/or perform other functions.

In some embodiments, the server 515 may perform the functionalities as discussed herein as part of a "cloud" network or may otherwise communicate with other hardware or software components within the cloud to send, retrieve, or otherwise analyze data. In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 572, 559 (e.g., working in connection with the respective operating systems 579, 557) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A method for rendering portions of editable product designs, the method comprising:
    rendering an editable product design for viewing by a user within a first portion of a user interface and a second portion of the user interface, the editable product design being rendered within the second portion in a first configuration and a first orientation;
    receiving, from the user interacting with the editable product design within the first portion of the user interface, a selection of a portion of the editable product design, wherein each respective portion of the editable product design includes one or more vertices defining a respective bounding box for the respective portion;
    calculating, by a rendering algorithm, (a) an average normal vector in a first direction for the portion of the editable product design based on a vertex of the portion and (b) a center of the portion based on a bounding box of the portion;
    generating, by the rendering algorithm, a ray emitting in the first direction that has an origin at the center of the portion;
    determining, by the rendering algorithm based on the selection and whether the ray is occluded from display on the user interface, (i) whether to adjust the editable product design from the first configuration to a second configuration that causes the portion to be displayable on the user interface and (ii) whether to adjust the editable product design from the first orientation to a second orientation that causes the portion to be displayed on the user interface; and
    based on the determining, rendering the editable product design within the second portion of the user interface in at least one of the second configuration or the second orientation in order to render the portion of the editable product design within the second portion of the user interface for viewing by the user.

2. The method of claim 1, further comprising:
    determining, by the rendering algorithm, that the ray is occluded from display on the user interface;
    adjusting, by the rendering algorithm, the editable product design from the first orientation to the second orientation by rotating the editable product design along at least one of a pitch axis of the ray or a yaw axis of the ray until the ray is displayable on the user interface; and
    rendering the editable product design within the second portion of the user interface in the second orientation.

3. The method of claim 2, wherein adjusting, by the rendering algorithm, the editable product design from the first orientation to the second orientation by rotating the editable product design along at least one of the pitch axis of the ray or the yaw axis of the ray until the ray is displayable on the user interface further comprises:
    incrementally rotating, by the rendering algorithm, the editable product design along at least one of (i) the pitch axis of the ray by 5° between 90° and −90° relative to the first direction of the ray, or (ii) the yaw axis of the ray by 5° between 90° and −90° relative to the first direction of the ray.

4. The method of claim 1, wherein the editable product design is configured to be rendered within the second portion in a plurality of configurations, and the method further comprises:
    determining, by the rendering algorithm, that the ray is occluded from display on the user interface;
    rotating, by the rendering algorithm, the editable product design along at least one of a pitch axis of the ray or a yaw axis of the ray;
    responsive to determining that the ray is occluded from display on the user interface at all rotations of the pitch axis of the ray and the yaw axis of the ray, determining, by the
    rendering algorithm, that the second configuration of the plurality of configurations causes the portion to be displayable on the user interface; and
    rendering the editable product design within the second portion of the user interface in the second configuration.

5. The method of claim 4, wherein each respective configuration of the plurality of configurations includes a corresponding animation sequence that transitions the editable product design from the first configuration to the respective configuration, and wherein determining, by the rendering algorithm, that the second configuration of the plurality of configurations causes the portion to be displayable on the user interface further comprises:
    executing, by the rendering algorithm, each corresponding animation sequence for each respective configuration to determine whether or not any corresponding animation sequence causes the portion to be displayable on the user interface;
    determining, by the rendering algorithm, that a second corresponding animation sequence for the second configuration causes the portion to be displayable on the user interface; and
    determining, by the rendering algorithm, that the second configuration of the plurality of configurations causes the portion to be displayable on the user interface.

6. The method of claim 4, wherein rendering the editable product design within the second portion of the user interface in the second configuration further comprises:
    rendering an animation sequence that corresponds to the second configuration and causes the editable product design to transition from the first configuration to the second configuration.

7. The method of claim 1, further comprising:
    calculating, by the rendering algorithm, a respective bounding box for each respective portion of the editable product design based on a maximum vertex for each spatial dimension of the respective portion and a minimum vertex for each spatial dimension of the respective portion.

8. The method of claim 1, wherein the editable product design is representative of a shipping box with a top, the first configuration includes the top being in a closed configuration, the second configuration includes the top being in an open configuration, and wherein rendering the editable product design within the second portion of the user interface in at least one of the second configuration or the second orientation further comprises:

rendering an animation sequence that features the top of the editable product design transitioning from the first configuration to the second configuration.

9. The method of claim 1, wherein rendering the editable product design within the second portion of the user interface in at least one of the second configuration or the second orientation in order to render the portion of the editable product design within the second portion of the user interface for viewing by the user further comprises:

generating, by the rendering algorithm, a ray emitting in a first direction that has an origin at a center of the portion; and rendering the editable product design within the second portion of the user interface based on a distance along the ray and a second direction that is antiparallel to the first direction.

10. A system for rendering portions of editable product designs, the system comprising:

a user interface;

a memory storing a set of computer-readable instructions comprising at least a rendering algorithm; and a processor interfacing with the user interface and the memory, and configured to execute the set of computer-readable instructions to cause the processor to:

render an editable product design for viewing by a user within a first portion of the user interface and a second portion of the user interface, the editable product design being rendered within the second portion in a first configuration and a first orientation, receive, from the user interacting with the editable product design within the first portion of the user interface, a selection of a portion of the editable product design, wherein each respective portion of the editable product design includes one or more vertices defining a respective bounding box for the respective portion;

calculate, by the rendering algorithm, (a) an average normal vector in a first direction for the portion of the editable product design based on a vertex of the portion and (b) a center of the portion based on a bounding box of the portion;

generate, by the rendering algorithm, a ray emitting in the first direction that has an origin at the center of the portion;

determine, by the rendering algorithm based on the selection and whether the ray is occluded from display on the user interface, (i) whether to adjust the editable product design from the first configuration to a second configuration that causes the portion to be displayable on the user interface and (ii) whether to adjust the editable product design from the first orientation to a second orientation that causes the portion to be displayed on the user interface, and based on the determining, render the editable product design within the second portion of the user interface in at least one of the second configuration or the second orientation in order to render the portion of the editable product design within the second portion of the user interface for viewing by the user.

11. The system of claim 10, wherein the set of computer-readable instructions, when executed, further cause the processor to:

determine, by the rendering algorithm, that the ray is occluded from display on the user interface;

adjust, by the rendering algorithm, the editable product design from the first orientation to the second orientation by rotating the editable product design along at least one of a pitch axis of the ray or a yaw axis of the ray until the ray is displayable on the user interface; and render the editable product design within the second portion of the user interface in the second orientation.

12. The system of claim 11, wherein the set of computer-readable instructions, when executed, further cause the processor to adjust, by the rendering algorithm, the editable product design from the first orientation to the second orientation by:

incrementally rotating, by the rendering algorithm, the editable product design along at least one of (i) the pitch axis of the ray by 5° between 90° and −90° relative to the first direction of the ray, or (ii) the yaw axis of the ray by 5° between 90° and −90° relative to the first direction of the ray.

13. The system of claim 10, wherein the editable product design is configured to be rendered within the second portion in a plurality of configurations, and the set of computer-readable instructions, when executed, further cause the processor to:

determine, by the rendering algorithm, that the ray is occluded from display on the user interface;

rotate, by the rendering algorithm, the editable product design along at least one of a pitch axis of the ray or a yaw axis of the ray;

responsive to determining that the ray is occluded from display on the user interface at all rotations of the pitch axis of the ray and the yaw axis of the ray, determine, by the rendering algorithm, that the second configuration of the plurality of configurations causes the portion to be displayable on the user interface; and render the editable product design within the second portion of the user interface in the second configuration.

14. The system of claim 13, wherein each respective configuration of the plurality of configurations includes a corresponding animation sequence that transitions the editable product design from the first configuration to the respective configuration, and wherein the set of computer-readable instructions, when executed, further cause the processor to determine, by the rendering algorithm, that the second configuration of the plurality of configurations causes the portion to be displayable on the user interface by:

executing, by the rendering algorithm, each corresponding animation sequence for each respective configuration to determine whether or not any corresponding animation sequence causes the portion to be displayable on the user interface;

determining, by the rendering algorithm, that a second corresponding animation sequence for the second configuration causes the portion to be displayable on the user interface; and determining, by the rendering algorithm, that the second configuration of the plurality of configurations causes the portion to be displayable on the user interface.

15. The system of claim 13, wherein the set of computer-readable instructions, when executed, further cause the processor to render the editable product design within the second portion of the user interface in the second configuration by:

rendering an animation sequence that corresponds to the second configuration and causes the editable product design to transition from the first configuration to the second configuration.

16. The system of claim 10, wherein the set of computer-readable instructions, when executed, further cause the processor to:

calculate, by the rendering algorithm, a respective bounding box for each respective portion of the editable product design based on a maximum vertex for each spatial dimension of the respective portion and a minimum vertex for each spatial dimension of the respective portion.

17. The system of claim 10, wherein the editable product design is representative of a shipping box with a top, the first configuration includes the top being in a closed configuration, the second configuration includes the top being in an open configuration, and wherein the set of computer-readable instructions, when executed, further cause the processor to render the editable product design within the second portion of the user interface in at least one of the second configuration or the second orientation by:

rendering an animation sequence that features the top of the editable product design transitioning from the first configuration to the second configuration.

18. A non-transitory computer-readable storage medium having stored thereon a set of instructions, executable by at least one processor, for rendering portions of editable product designs, the instructions comprising:

instructions for rendering an editable product design for viewing by a user within a first portion of a user interface and a second portion of the user interface, the editable product design being rendered within the second portion in a first configuration and a first orientation;

instructions for receiving, from the user interacting with the editable product design within the first portion of the user interface, a selection of a portion of the editable product design, wherein each respective portion of the editable product design includes one or more vertices defining a respective bounding box for the respective portion;

instructions for calculating, by a rendering algorithm, (a) an average normal vector in a first direction for the portion of the editable product design based on a vertex of the portion and (b) a center of the portion based on a bounding box of the portion;

instructions for generating, by the rendering algorithm, a ray emitting in the first direction that has an origin at the center of the portion;

instructions for determining, by the rendering algorithm based on the selection and whether the ray is occluded from display on the user interface, (i) whether to adjust the editable product design from the first configuration to a second configuration that causes the portion to be displayable on the user interface and (ii) whether to adjust the editable product design from the first orientation to a second orientation that causes the portion to be displayed on the user interface; and based on the determining, instructions for rendering the editable product design within the second portion of the user interface in at least one of the second configuration or the second orientation in order to render the portion of the editable product design within the second portion of the user interface for viewing by the user.

* * * * *